US005558362A

United States Patent [19]
Acker et al.

[11] Patent Number: 5,558,362
[45] Date of Patent: Sep. 24, 1996

[54] GAS BAG MODULE

[75] Inventors: Dominique Acker, Alfdorf; Adolf M. Kuhn, Welzheim, both of Germany

[73] Assignee: TRW Repa GmbH, Alfdorf, Germany

[21] Appl. No.: 431,102

[22] Filed: Apr. 28, 1995

[30]  Foreign Application Priority Data

May 2, 1994 [DE] Germany ............................ 44 15 374.0

[51] Int. Cl.⁶ ............................ B60R 21/20; B60R 21/26
[52] U.S. Cl. ........................................ 280/728.2; 280/736
[58] Field of Search ................................ 280/728.2, 732, 280/736, 740, 741, 743.1, 731, 728.1, 730.1

[56]  References Cited

U.S. PATENT DOCUMENTS

| | | | |
|---|---|---|---|
| 3,778,085 | 12/1973 | Lipkin | 280/732 |
| 5,263,739 | 11/1993 | Webber et al. | 280/728.2 |
| 5,277,442 | 1/1994 | Cuevas | 280/728.2 |
| 5,284,358 | 2/1994 | Rhein | 280/728.2 |
| 5,308,109 | 5/1994 | Igawa | 280/728.2 |
| 5,308,110 | 5/1994 | Kokeguchi | 280/728.2 |
| 5,342,081 | 8/1994 | Rogerson | 280/728.2 |
| 5,433,472 | 7/1995 | Green et al. | 280/728.2 |
| 5,468,011 | 11/1995 | Donegan et al. | 280/732 |
| 5,484,163 | 1/1996 | Jenkins | 280/728.2 |

FOREIGN PATENT DOCUMENTS

| | | | |
|---|---|---|---|
| 0404302 | 12/1990 | European Pat. Off. . | |
| 2319147 | 10/1974 | Germany | 280/728.2 |
| 6-122354 | 5/1994 | Japan | 280/728.2 |

*Primary Examiner*—Eric D. Culbreth
*Assistant Examiner*—Peter C. English
*Attorney, Agent, or Firm*—Tarolli, Sundheim, Covell, Tummino & Szabo

[57]  ABSTRACT

A gas bag module of a vehicular passenger restraint system has a gas bag stowable on one side of a mounting wall and, for inflating the gas bag, a gas generator mountable on the opposite side of this mounting wall. An inflation opening of the gas bag is provided with a bead which grips behind the mounting wall.

6 Claims, 7 Drawing Sheets

GAS BAG MODULE

BACKGROUND OF THE INVENTION

1. Field of the Invention

The invention relates to a gas bag module for a passenger-side vehicular restraint system.

2. Description of the Prior Art

Producing the connections between a gas bag and a mounting wall on the one hand, and between a gas generator and the mounting wall on the other, is relatively critical and is usually complicated. These connections are required to withstand high mechanical stresses and need to be practically gas-tight. Problematic is also the generally high number of connections involved, which are usually achieved by screws, rivets and the like. Such connections are not only complicated, they are also a continuous source for errors. In conclusion, the components of any restraint system need to be optimally adapted to each other with due regard to the conditions existing in the vehicle involved, this being the reason why a corresponding assembly was until now specially designed in the majority of cases for the particular application in question, which precluded a means of rational production.

SUMMARY OF THE INVENTION

An object of the invention is to provide a compact gas bag module which satisfies the high demands as regards mechanical stress resistance and gas-tightness, and yet permits simple and cost-effective production and installation, the intention in particular being also to simplify the critical connections between the gas bag and mounting wall, on the one hand, and between the gas generator and the mounting wall on the other, whilst assuring the demanded reliability.

In accordance with the invention, a gas bag module for a passenger-side vehicular restraint system is provided which comprises an elongate mounting wall and an inflatable gas bag with a gas bag wall and an inflation opening defined in the gas bag wall by a bead. The mounting wall has an outer peripheral edge with a first, outwardly extending wall portion and a second wall portion extending transversely to the first wall portion. The first and second wall portions define a peripheral seat, and the bead is engaged in the seat with a tight fit. The bead is located on a first side of the mounting wall and the gas bag wall extends on a second side of the mounting wall opposite the first side. Preferably, the peripheral seat has an outwardly directed retaining ridge formed on the second wall portion, and the mounting wall is provided on the first side thereof with a mounting structure for an elongate gas generator.

Accordingly, the gas bag is retained by the bead on the mounting wall. Separate fasteners such as, for example, screws, rivets and the like are no longer necessary. To mount the gas bag on the mounting wall it is sufficient to introduce the latter by its border involved through the inflation opening into the gas bag and following suitable turning relative to this inflation opening, to pull it outwards, until the bead snaps into place in the seat of the mounting wall. As soon as a pressure is built up within the gas bag, the bead is pulled against this seat, so that a reliable seal is assured to the outside.

According to a further embodiment of the invention, the mounting wall comprises a plurality of resiliently deflectable arms extending away from the mounting wall on the first side thereof. The gas generator has a generally cylindrical container and the arms, upon pushing the gas generator towards the mounting wall, being initially resiliently deflected by the container and thereafter snapping behind the container with this structure, mounting of the gas generator on the mounting wall merely requires insertion into the resilient clamp support formed by the deflectable arms by which it is then held in a position in which, at the same time, a tight connection to the interior of the gas bag is assured. Due to this snapping mount, separate additional means of connection are no longer necessary to secure the gas generator to the mounting wall. Due to its compact configuration, not only installation of the module in the vehicle but also shipping is simplified, there being additionally the possibility of storing the gas generator separately from a preassembled unit comprising the gas bag and the mounting wall, since due to the simple snap connection in the final assembly even this gas generator can be mounted on the mounting wall with no problem. The danger of an accidental ignition during storage or during transport can thus be reduced to a minimum.

BRIEF DESCRIPTION OF THE DRAWINGS

Further features and advantages of the invention will be apparent from the description of prefered embodiments and from the drawing to which reference is made and in which.

DESCRIPTION OF THE PREFERRED EMBODIMENTS

As illustrated in FIGS. 1 to 6 a gas bag module 10 of a vehicular passenger restraint system comprises a gas bag 14 stowable on one side of a mounting wall 12 and a gas generator 16 mountable on the opposite side of the mounting wall 12 for inflating the gas bag. The mounting wall 12 receiving the gas bag 14 and the gas generator 16 is part of the gas bag module 10. One such gas bag module 10 may be used, for example, in conjunction with an H.G.I gas generator.

Figure 1:
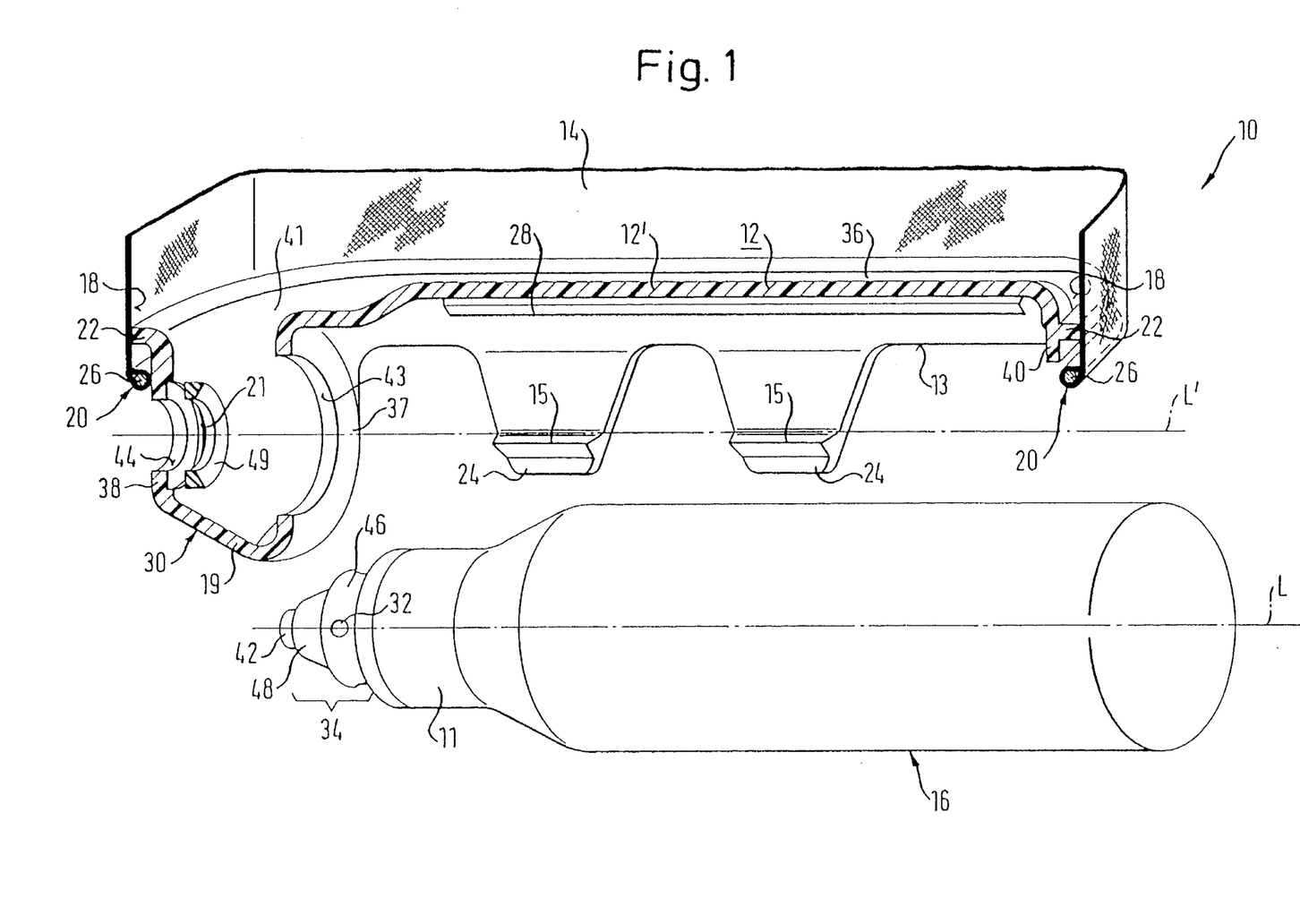
FIG. 1 is a schematic, partly sectioned side view of a gas bag module prior to the gas generator being mounted on a mounting wall.

The gas bag 14 has an inflation opening 18 through which in the case of a vehicle-sensitive activation of the gas generator 16, gas given off by the latter is able to flow into the interior of the gas bag 14, causing it to be inflated to achieve the desired restraining function. In the standby condition the gas bag 14 is folded together on the corresponding side of the mounting wall 12 so that it is unfolded into the vehicle interior by the inflow of gas, whilst being retained at the mounting wall 12 in the region of its edging surrounding the inflation opening 18.

For this purpose the gas bag 14 is provided along the edging surrounding the inflation opening 18 with a bead 20 directed radially inwards. This bead 20 grips behind a flange-like, outwardly directed border 22 of the mounting wall 12 in the assembled condition.

The mounting wall 12, preferably made of a plastic, is configured in the present example embodiment integral with four resilient clamping arms 24 which partly clasp the gas generator 16 on opposing longitudinal sides, two such resilient deflectable clamping arms 24 being provided on each longitudinal side of the mounting wall 12. Accordingly, these form a clamping mount by means of which the gas generator 16 is elastically held against the mounting wall 12. As soon as the gas generator 16 snaps into place in the clamping mounting a tight connection to the interior of the gas bag 14 is produced at the same time as will be detailed further below.

The gas generator 16 has a cylindrical outer wall and is provided with a bottle-neck shaped extension 11 adjoining an axial end section 46 having gas outlet openings 32 distributed about its circumference, this end section translating via a truncated cone shaped intermediate region 48 into a cylindrical projection 42 coaxial with the longitudinal axis L.

The mounting wall 14 has a main section 12' extending over part of the circumference of the gas generator 16 and substantially adapted to the shape of the latter, this main section 12' following at least approximately the outer contour of the gas generator 16 , particularly also in the region of the bottle-neck shaped extension 11 of the gas generator 16.

Figure 4:
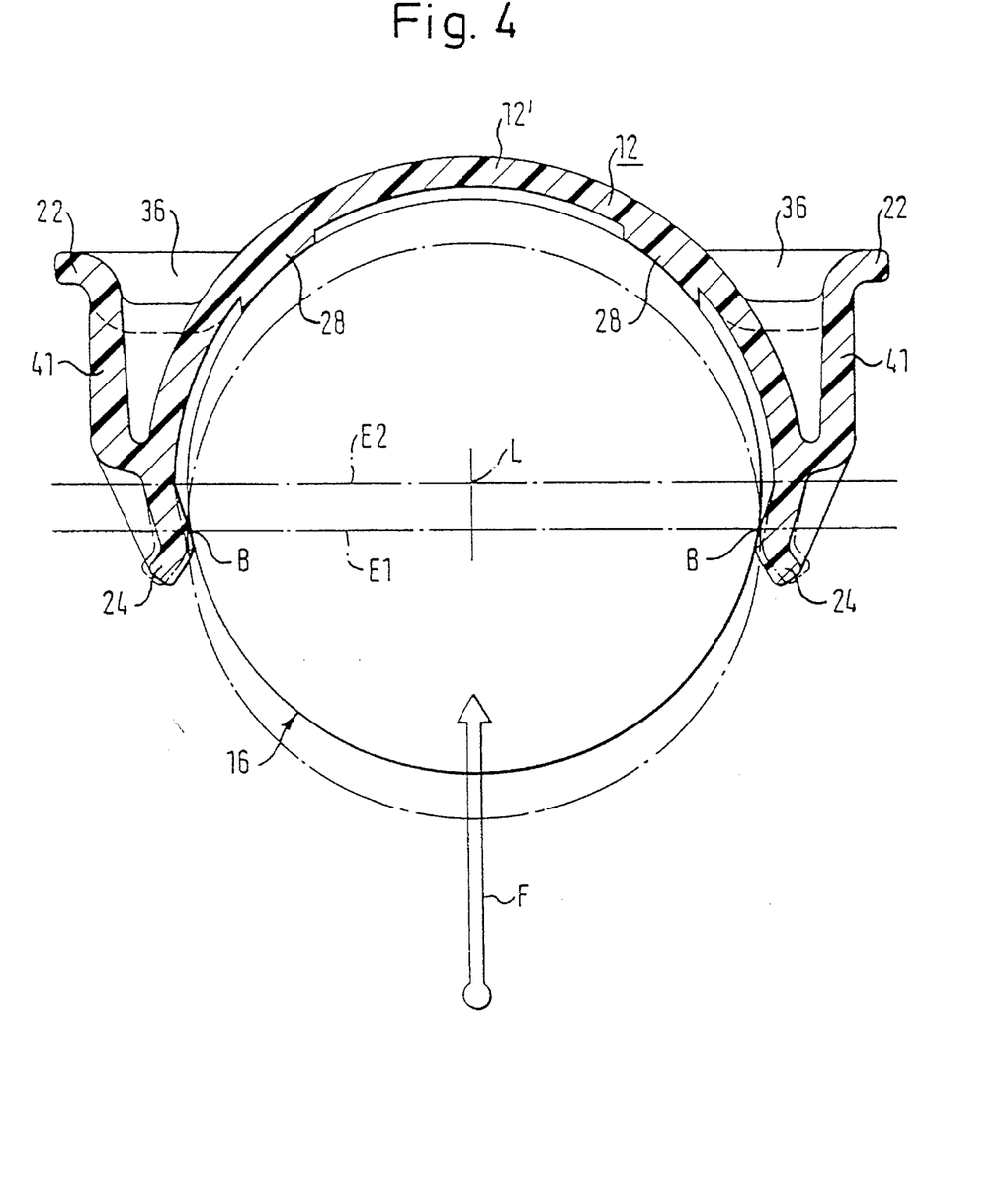
FIG. 4 is a schematic cross-section view of the gas bag module shown in FIG. 1 without the gas bag.
Figure 5:
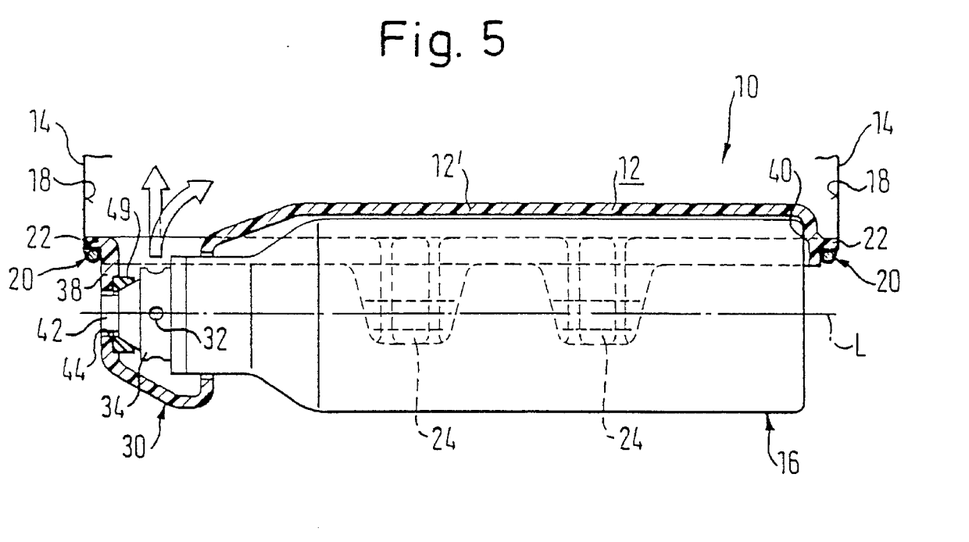
FIG. 5 is a schematic longitudinal section view of the gas bag module shown in FIG. 1 with the gas generator inserted in the clamp support of the mounting wall.
Figure 6:
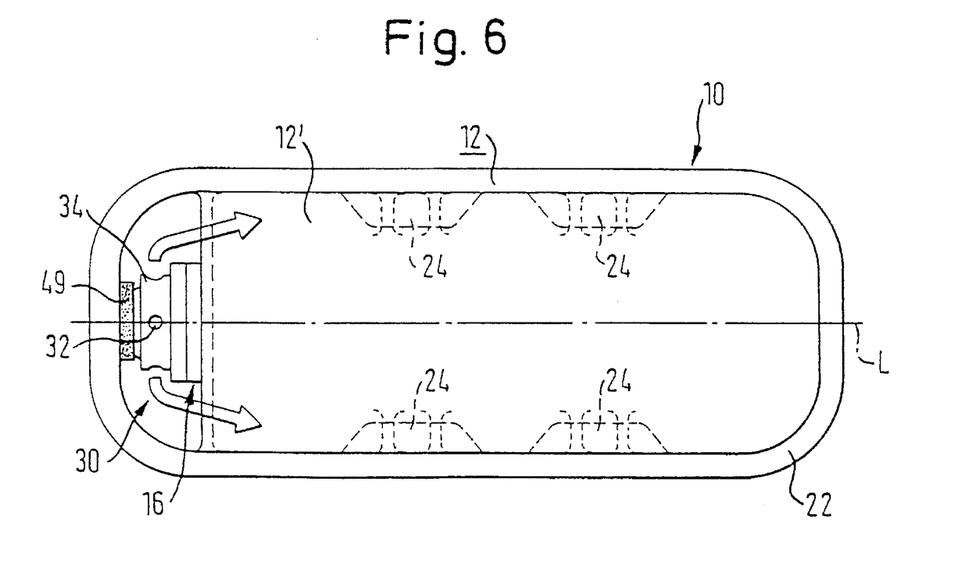
FIG. 6 is a plan view of the gas bag module shown in FIG. 5, the gas bag being eliminated, however.

This partly cylindrical main section 12' of the mounting wall 12 is partly circular in cross-section, the gas generator 16 being clasped over part of its circumference, extending over less than half thereof.

At each of the two opposing borders 13 of the main section 12' two of the resilient clamping arms 24 are provided in the extension of the main section 12'. These clamping arms 24, each preferably provided with a longitudinal rib 15 (FIG. 1) directed inwards, clasp the gas generator 16 so far that, when the gas generator 16 is mounted, the plane E1 containing the points of contact B between the clamping arms 24 and the gas generator 16, as viewed from the mounting wall 12, is located behind a plane E2 containing the longitudinal axis L and oriented parallel to E1 (FIG. 4). The gas generator 16 is thereby forced against the partly cylindrical main section 12' of the mounting wall 12 by the resilient clamping support of the four clamping arms 24 contained in the present example embodiment.

In the illustrated example embodiment the gas generator 16 is supported by longitudinal ribs 28 parallel to the longitudinal axis L which are formed at the generator side of the main section 12' of the mounting wall 12 (FIGS. 1 and 4). At the end facing away from the main section 12' the resilient clamping arms 24 are, in turn, bent outwards (FIG. 4). The longitudinal ribs 28, just the same as the resilient clamping arms 24 are formed integral with the mounting wall 12 made of plastic.

In the axial extension of the main section 12' adapted to the shape of the gas generator 16 the mounting wall 12 is formed integral with a gas collecting chamber 30 into which the end 34 of the gas generator 16 is insertable, this end 34 comprising the end section 46 having the gas outlet openings 32 as well as the intermediate region 48 in the form of a truncated cone located between the end section 46 and the cylindrical projection 42.

The partly cylindrical collecting chamber 30 coaxially located to the longitudinal axis L' of the resilient support 24 (FIG. 1) and the thus coincident longitudinal axis L of the fitted gas generator 16 is open towards the side of the gas bag 14, it merging further into two gas ducts 36 (FIGS. 1 and 4) of the mounting wall 12 which are also open in the direction of the side of the gas bag 14. These gas ducts 36 at least partly surrounding the main section 12' of the mounting wall 12 adjoin directly on the inside of the outer border 22 of the mounting wall 12 gripped from behind by bead 20 of gas bag 14' thus ensuring that the generally rectangular inflation opening 18 with rounded corners receives a uniform charge of pressurized gas.

A lower wall section 19 of the gas collecting chamber 30 is inclined with respect to the longitudinal axis L' of the resilient clamping support 24 and thus adapted approximately to the contour of the end 34 of the gas generator 16.

The gas collecting chamber 30 has two front walls 37, 38 which are parallel to each other and perpendicular to the longitudinal axis L', each of which is provided with an opening 43, 44 coaxial to the longitudinal axis L'. The opening 43 of the axially inwards located larger front wall 37 surrounds by its border the bottle-neck shaped extension 11 of the gas generator 16, whilst the cylindrical projection 42 of the gas generator 16 engages the smaller opening 44 of the axially outwards located smaller front wall 38.

On the inside of the axially outwards located front wall 38 an annular recess 21 bordering the opening 44 is provided into which a ring seal 49 having a trapezoidal cross-section is inserted. Via this ring seal 49 the gas generator 16 is in contact with the front wall 38 by its intermediate region 48 which has the form of a truncated cone and is axially tapered outwardly. Accordingly this outer front wall 38 of the gas collection chamber 30 also serves as an axial abutment for the gas generator 16.

At the other end the gas generator 16 is in contact with a further axial abutment 40 of the mounting wall 12 which is formed by a front-end section of a peripheral wall 41 (FIG. 1 and 4), on which the border 22 of the mounting wall 12, gripped behind by the bead 20, is located and which extends at least substantially perpendicular to the plane containing this border 22. The peripheral wall 41 defines together with the main section 12' of the mounting wall 12 the gas ducts 36 surrounding this main section 12' at least substantially.

The gas generator 16 is thus secured axially between the two abutments 38, 40, the ring seal 49 being preferably compressed by the gas generator 16 in the axial direction the latter being held axially and the clamping support being snapped. In conjunction with the truncated cone shaped intermediate region 48 of the gas generator 16 a centering of the gas outlet end of the gas generator 16 is also achieved, once the latter has been inserted with its cylindrical projection 42 into the opening 44 and is held against the ring seal 49 via the intermediate region 48.

Figure 2:
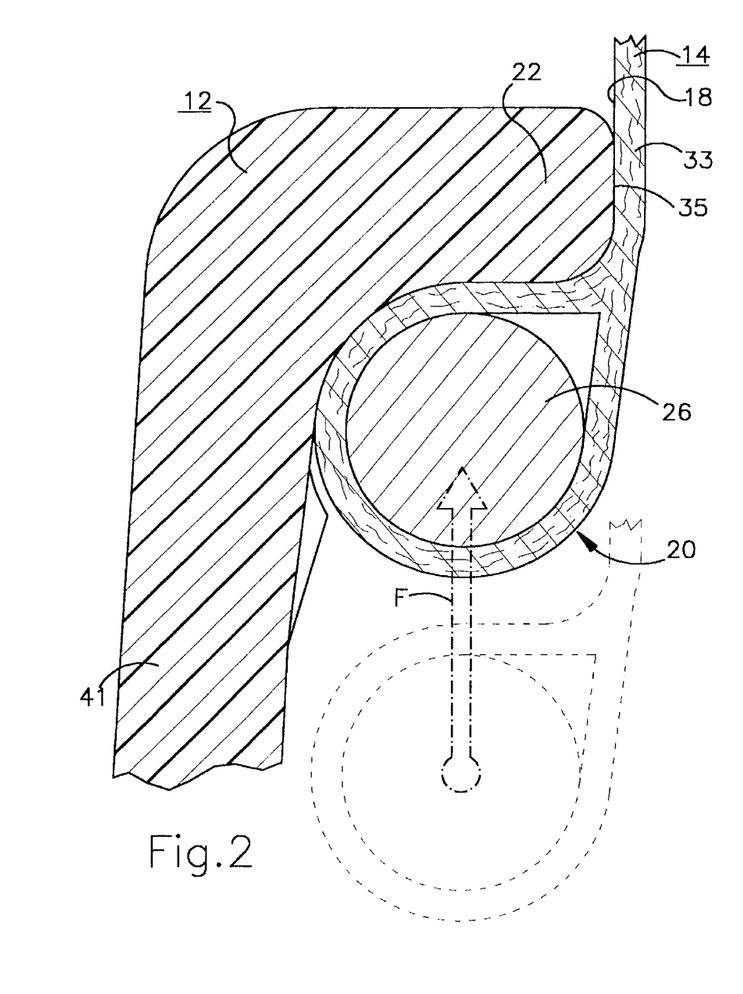
FIG. 2 is a schematic enlargened section view of the border area of the mounting wall of the gas bag module shown in FIG. 1, FIGS. 3a and 3b are schematic section views of beads of differing configuration.
Figures 3A, 3B:
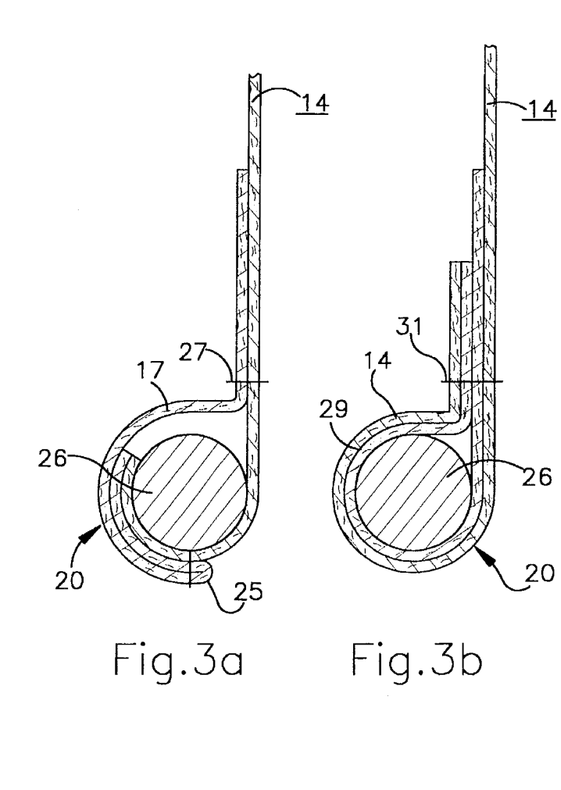

In the present example embodiment the bead 20 is formed by a tubular border of the inflation opening 18 of the gas bag 14 and by a closed reinforcement ring inserted in the opening 18 (viz. in particular FIGS. 2 and 3). The reinforcement ring 26 is expediently stitched into the hem of the border of the inflation opening 18. For this purpose several layers of material, for instance a fabric, may be laid one on an other in the region of the bead.

As illustrated in FIG. 3a the border of the gas bag 14 is wrapped around the reinforcement ring 26 by somewhat more than half the circumference of the latter. A further material layer 17 is laid with a hemmed end over the border of the gas bag wrapped around the reinforcement ring 26 and stitched at this hemmed end 25 to the gas bag. The remaining non-hemmed portion of the further material layer 17 is led to the inner wall of the gas bag 14 over the remaining circumference of the reinforcement ring 26 and stitched to the gas bag, for example, at position 27.

In FIG. 3b an alternative way of producing the bead 20 is shown, in which the border of the gas bag 14 is completely hemmed around the reinforcement ring 26, with a further layer of material 29 placed between this border and the reinforcement ring 26, this layer also being fully hemmed around the reinforcement ring 26 so that there are four layers of material one on another at a seam 31 located behind the reinforcement ring 26 which are stitched simultaneously.

To install the gas bag module 10 the sealing ring 49 is first placed in the recess 21 provided in the front wall 38 of the gas collecting chamber 30. The mounting wall 12 is then inserted into the inflation opening 18 of the gas bag 14 provided with the bead 20. This is followed by turning the mounting wall 12 so that the bead 20 of the gas bag 14 snaps into place preferably with positive interlock behind the outer border 22 of the mounting wall 12 when the gas bag 14 is partly withdrawn (viz. e.g. FIG. 2). The direction of assembly is indicated by an arrow F in FIG. 2. Whilst the bead 20 is beared tightly against the side of the border 22 facing the gas generator 16 and with the outer surface of the peripheral wall 41 of the mounting wall 12, the section 33 of the gas bag 14 bordering on the bead 20 is beared tightly against the peripheral surface 35 of the border 22.

Subsequently, the gas generator 16 is mounted on the end of the mounting wall 12 opposite to the gas bag 14. For this purpose the cylindrical projection 42 of the gas generator 16 is to be inserted in the opening 44 provided in the front wall 38 of the gas collecting chamber 30. Furthermore, the gas generator 16 is to be pressed sufficiently in the direction of the arrow F in FIG. 4 against the main section 12' of the mounting wall 12 so that it snaps into place in the resilient clamping support formed by the clamping arms 24. In this action the clamping arms 24 are first forced somewhat outwardly, they thereby first being positioned as indicated dash-dotted in FIG. 4. When the gas generator 16 is further pressed in the direction of the main section 12' of the mounting wall 12 it will then snap into place in the flexible clamping support, resulting in its clamping arms 24 springing back into place and forcing the gas generator 16 against the longitudinal ribs 28 provided on the main section 12' of the mounting wall 12.

According to FIG. 4 the resulting points of contact B between the clamping arms 24 and the gas generator 16 are located in a plane E1 which is located below a plane E2 being parallel thereto and running through the longitudinal axis L.

The attachment of the gas generator 16 to the mounting wall 12 is thus assured by the resilient clamping arms 24. By means of these clamping arms 24 and the sealing ring 49 being beared tightly against the truncated cone shaped intermediate region 48 of its end 34 the gas generator 16 is held in radial direction. Axially the gas generator 16 is secured by the two abutments 38 and 40 as defined by the axial outer front wall 38 of the gas connecting chamber 30 and the peripheral wall 41 respectively, the latter being at least substantially perpendicular to the plane containing the border 22. By the end 34 of the gas generator 16 inserted between the axial abutments 38, 40 being supported via the sealing ring 49 on the front wall 38, this sealing ring 49 is compressed by the gas generator 16. Accordingly, when the gas generator 16 snaps into place in the flexible clamping support provided by the clamping arms 24, an outwardly tight connection of the gas outlet end 34 of the gas generator 16 with the interior of the gas bag 14 is also assured at the same time.

When the gas generator 16 is ignited in the case of a collision, the gas emerging from the gas outlet openings 32 flows into the gas collecting chamber 30 and then into the gas ducts 36 and through the inflation opening 18 into the interior of the gas bag 14 so that the latter unfolds into the passenger space of the vehicle involved. The forces produced by the internal pressure built up in the gas bag 14 are absorbed by the mounting wall 12 mounted in the vehicle via the positive interlocking connection in the region of the bead 20 gripping behind the border 22.

Figure 7:
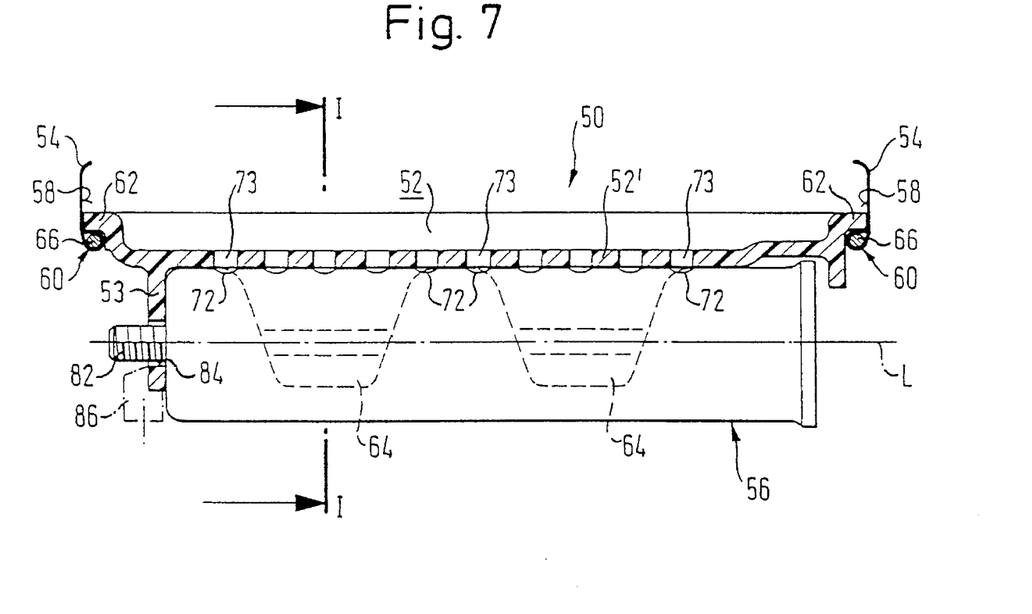
FIG. 7 a schematic, partially sectioned side view of further embodiment of a gas bag module.
Figure 8:
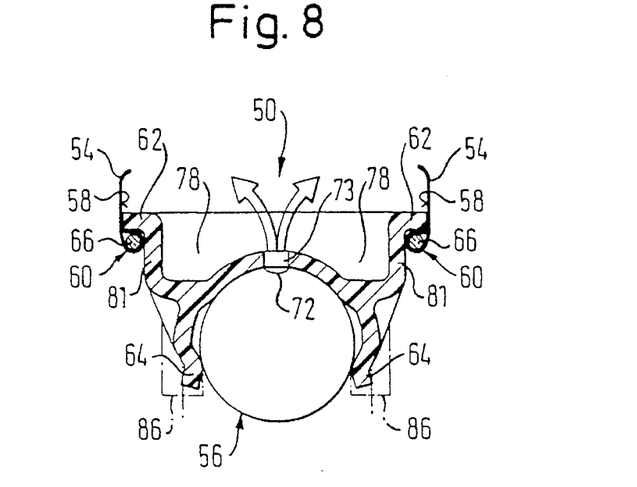
FIG. 8 is a schematic cross-section view along the line I—I of the gas bag module shown in FIG. 7.

The embodiment of a gas bag module 50 illustrated in FIGS. 7 and 8 is intended for use in particular in conjunction with a solid propellant gas generator. Parts of this embodiment comparable to those shown in FIGS. 1 to 6 are identified by the same reference numeral elevated by 40.

As illustrated in the FIGS. 7 and 8 the gas generator 56 is formed cylindrical throughout and without any bottle-neck shaped elongation. In the shell of the cylindrical gas generator 56 a plurality of gas outlet openings 72 is provided, aligned in a row parallel to the longitudinal axis L and distributed over the length of the gas generator 56. The mounting wall 52 contains a corresponding number of gas-thruput openings 73 arranged and aligned in the same way, in which the gas outlet openings 72 of the gas generator 56 mounted on the mounting wall 52 are aligned.

A wall perpendicular to the main section 52' of the mounting wall 52 on the side facing the gas generator 56 serves as left-hand axial abutment as shown in FIG. 7. In this wall 53 an opening 84 is formed, through which a coaxial cylindrical projection 82 of the gas generator 56 mounted to the mounting wall 52 protrudes outwardly.

The gas generator 56 is in turn held by four resilient clamping arms 64 laterally against the main section 52' of the mounting wall 52.

Again the gas bag 54 is provided in turn along the border surrounding the inflation opening 58 with a bead 60 which contains a closed reinforcement ring 66 inserted in the tubular border and which with positive interlock grips behind an outer border 62 of the mounting wall 52. The border 62 extending flange-like outwardly is in turn formed at an outer peripheral wall 81 (FIG. 8) which together with the main section 52' of the mounting wall 52 at least partly adapted to the shape of the cylindrical gas generator 58 defines gas ducts 78 which are open towards the side of the gas bag 54.

The main section 52' of the mounting wall 52 is formed without ribs so that the gas generator 56 is held directly against the corresponding side of the main section 52' by the resilient clamping arms 64, thus ensuring a gas-tight connection between the gas outlet openings 72 and the interior of the gas bag 54 through the gas thruput openings 73 in the main section 52'.

FIGS. 9 to 13 illustrate an example embodiment of a gas bag module 90 which may be used in particular in conjunction with an augment gas generator. Parts of this embodiment corresponding to those shown in FIGS. 1 to 6 are identified by the same reference numeral increased by 80.

Figure 9:
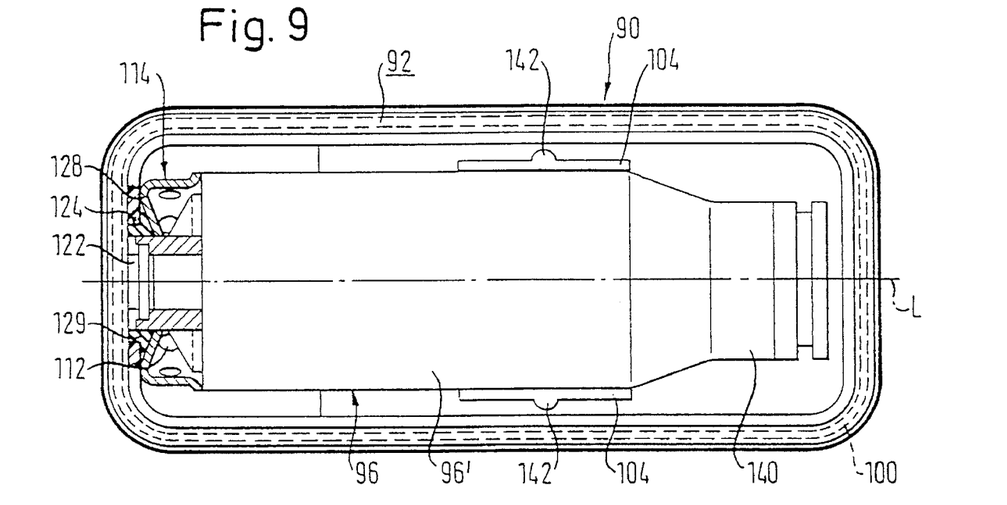
FIG. 9 is a schematic, partially sectioned view of a further embodiment of a gas bag module.

At one end 114 the gas generator 96 is provided with a row of gas outlet openings 112 distributed along its periphery. This end 114 has an outer diameter which is only slightly smaller than the cylindrical main section 96' of the gas generator 96 joining up with said end.

In turn the end 114 of gas generator 96 is provided with a coaxial cylindrical projection 122 which following installation of the gas generator 96 on the mounting wall 92 engages in an opening 124 which is formed in an axial outer front wall 118 of a gas collecting chamber 110. In the opening 124 a ring seal 129 is inserted which is in contact with a widened head on the inside of the front wall 118 of gas collecting chamber 110 serving as an axial abutment and which is pressed against the front wall 118 by a slanted shoulder 128 extending between the projection 122 and the outer periphery of the main section 96' of the gas generator 96. In this arrangement the sealing ring 129, part of which extends into the opening 124, is seated on the central projection 122, its widened head being arranged in the region of the relief formed by the inclined shoulder 128. The gas generator 96 is held against the front wall 118 by an axial abutment 120 of the mounting wall 92 engaging at the opposite end so that the sealing ring 129 is compressed by the slanted shoulder 128.

The axial inner front wall 117 of the gas collecting chamber 110 is inclined with respect to the axial outer front wall 118 located perpendicular to the longitudinal axis L. According to FIG. 10 this axial inner front wall 117 connected to the main section 92' of the mounting wall 92 is oriented slanting upwards to the right. In this front wall 117 of the gas connecting chamber 110 a further opening 123 is provided, which is larger in comparison to the opening 124, through which the gas generator 96 with its middle cylindrical main section 96' protrudes.

Figure 10:
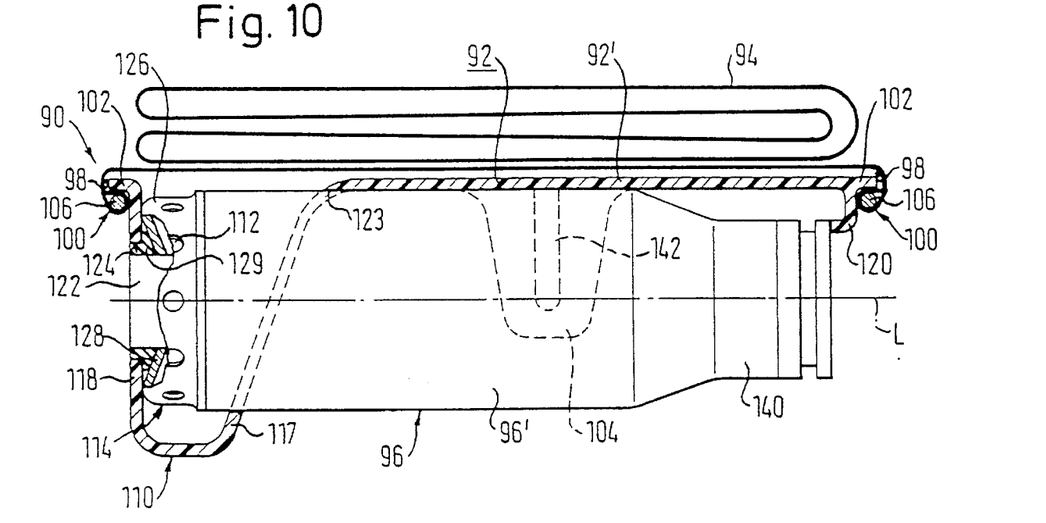
FIG. 10 is a schematic, partially sectioned side view of the gas bag module shown in FIG. 9.

The end 140 of the gas generator 96 opposite the cylindrical projection 122 is tapered bottle-neck shaped. The axial abutment 120 engaging end 140 and formed integral with the mounting wall 92 first extends perpendicular to the main section 92' of the mounting wall 92 downwards and is then bent hook-shaped axially inwards.

Figure 11:
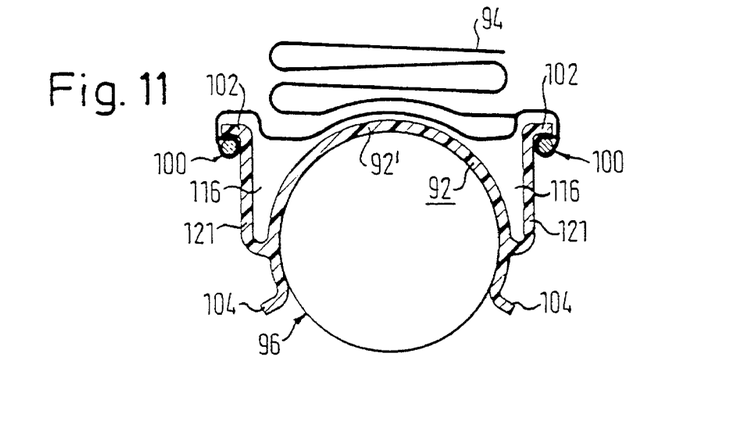
FIG. 11 is a schematic cross-sectional view of the gas bag module shown in FIG. 10.

The gas generator 96 is in turn held against the mounting wall 92 on the side by flexible clamping arms 104. In the present case, however, only two such clamping arms 104 are provided which are arranged more or less in the middle of the main section 92' of the mounting wall 92 on two longitudinal sides of the mounted gas generator 96 opposing each other. Each of the clamping arms 104 is provided with an outer reinforcement rib 142.

The gas bag 94 stowed folded on the opposite side of the mounting wall 92 is in turn provided along its border of the inflation opening 98 with a bead 100 which with positive interlock grips behind an outwardly protruding flange-shaped border 102 of the mounting wall 92 and which in turn contains a reinforcement ring 106 inserted in the tubular border.

The gas collecting chamber 110 which is open on the side of the gas bag 94 merges in outer gas ducts 116 which are in turn defined by the partly cylindrical main section 92' of the mounting wall 92 adapted to the shape of the gas generator 96 and by the outer peripheral wall 121 having the border 102.

Figure 12:
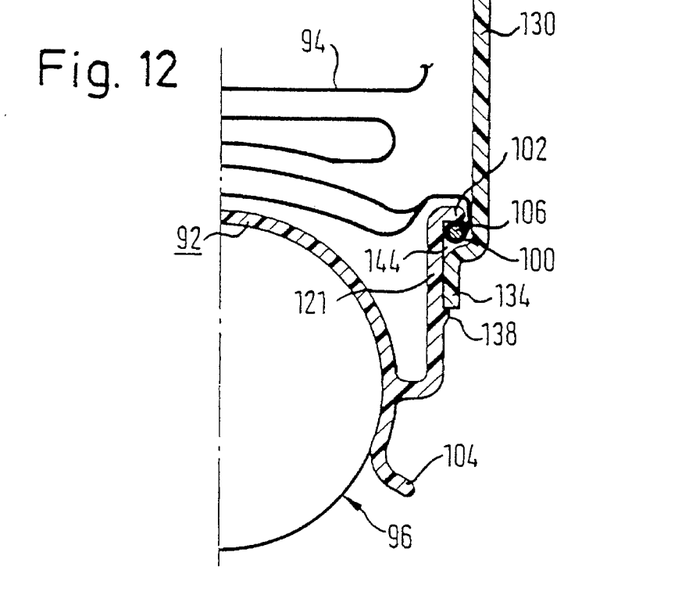
FIG. 12 is a schematic cross-section-partial view of the gas bag module shown in FIGS. 9 to 11 with an additional gas bag guiding frame and FIG. 13 is an illustration comparable to FIG. 12 illustrating the gas bag module shown in FIGS. 9 to 11 with an additional cover.

As shown in FIG. 12 the mounting wall 92 may be assigned a gas bag guiding frame 130 which is surrounding in the peripheral direction of the border 102, by means of which the gas bag 94 is guided when unfolded. This gas bag guiding frame 130 grips behind the border 102 of the mounting wall 92 by one end 134 which is suitably bent inwards and then in turn downwards in the longitudinal direction, and the bead 100 containing the reinforcement ring 106. For this purpose the gas bag guiding frame 130 is preferably pushed from the side of the gas generator 96 over the peripheral wall 121 of the mounting wall 92 having the border 102 and is locked in a position at its bent-over end 134 by an outer latching projection 138 provided on the peripheral wall 121. In this position the bead 100 is enclosed with positive interlock in an annular space 144 which is defined by the border 102 of the mounting wall 92, by the peripheral wall 121 connected thereto perpendicularly to the plane containing the border 102 and by the bent-over border 134 of the gas bag guiding frame 130.

The gas generator 96 is in turn held at the mounting wall 92 by the flexible clamping arms 104.

Figure 13:
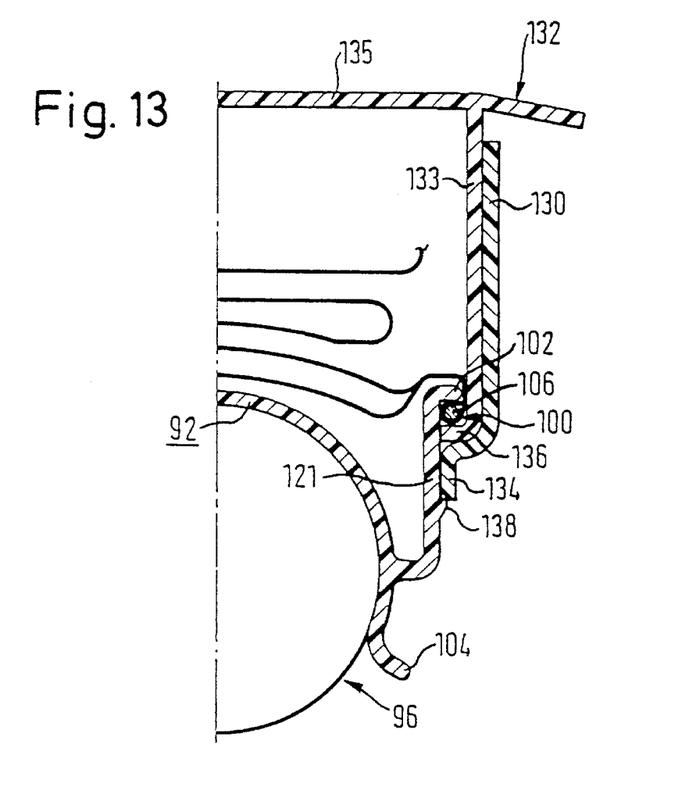

According to FIG. 13 a concealment cover 132 is provided, having at least one side wall 133 parallel to the gas bag guiding frame 130 and an outer wall 135 located at least substantially perpendicular thereto. The side wall 133 of the preferably flexibly configured cover is bent inwards at the lower end and inserted between the outwards located gas bag guiding frame 130 and the peripheral wall 121 of the mounting wall 92 in a way that its bent-over end 136 grips behind both the border 102 and the bent-over end 134 of the outer gas bag guiding frame 130, thus defining at the same time the cover 132 on the mounting wall 92 via the gas bag guiding frame 130.

The cover 132 is placed on the peripheral wall 121 of the mounting wall 92 provided with the border 102 from the side of the gas bag 94 preferably before the gas bag guiding frame 130 is mounted this action being facilitated by the mounting wall 92 and/or the cover 132 being configured flexible at least in part.

The gas bag guiding frame 130 is then pushed over the peripheral wall 121 of the mounting wall 92 from the other side until it is held in place by the latching projection 138 on the border 102 with its bent-down end 134 including the bent-down end 136 of the cover 132 and the bead 100. Accordingly, the gas bag guiding frame 130 serves simultaneously to support and fix the cover 132. The gas generator 96 is in turn held in place by the flexible clamping arms 104 on the mounting wall 92.

Such a gas bag guiding frame and/or such a cover may also be provided in conjunction with the remaining embodiments of a gas bag module.

Thus, the result of the above is that no additional fasteners whatsoever are required either for attaching the gas bag to the mounting wall or for attaching the gas generator to the mounting wall. Due to the positive interlock of the connections provided a gas-tight closure is ensured. Assembling and installing the gas bag module is thus substantially facilitated. Accordingly, simplified removal of the gas bag module is also possible. The number of different components is reduced to a minimum, this also reducing the total weight. Especially due to the oval shape of the inflation opening, the latter is stressed to only a minimum degree while filling the gas bag. Any permanent deformation of the mounting wall after an activation of the gas generator is practically excluded. A kind of fish-mouth effect occurs, resulting in the wall reattaining its original shape following pressure loading of the gas bag. Further benefits as regards installation and toughness are achieved due to the preferred flexibility of the mounting wall as regards mounting in the vehicle and as regards the gas inflow. Installation in the vehicle is further facilitated by the exceptionally compact configuration. Furthermore, the gas bag module can be used in conjunction with practically any type of gas bag. Also of advantage is the possible extension by a gas bag guiding frame and/or a concealment cover by exceptionally simple means and in turn without any additional fasteners. Finally, such a gas bag module can be produced by relatively simple means cost-effectively.

What is claimed is:

1. A gas bag module for a passenger-side vehicular restraint system, comprising an elongate mounting wall, an elongate gas generator having a generally cylindrical container, and an inflatable gas bag with a gas bag wall and an inflation opening defined in said gas bag wall by a bead, said mounting wall comprising an outer peripheral edge with a first, outwardly extending wall portion and a second wall portion extending transversely to said first wall portion, said first and second wall portions defining a peripheral seat, and said bead being engaged in said seat with a tight fit, said bead being located on a first side of said mounting wall and said gas bag wall extending on a second side of said mounting wall opposite said first side, and said mounting wall further comprising a plurality of resiliently deflectable arms extending away from said mounting wall on the first side thereof, said arms, upon pushing said gas generator towards said mounting wall, being initially resiliently deflected by said container and thereafter snapping behind said container.

2. The gas bag module of claim 1, wherein said mounting wall on its first side has a concave shape adapted to the shape of said container.

3. The gas bag module of claim 1, wherein said gas generator is provided with a plurality of gas outlet openings and said mounting wall is provided with ducting wall portions for directing gas supplied by said gas generator through said outlet openings into said inflation opening.

4. The gas bag module of claim 1, wherein said gas generator has an axial end portion provided with gas outlet openings, said mounting wall having an integral ducting wall portion with an opening formed therein, said axial end portion passing through said opening and into a gas collecting chamber defined by said ducting wall portion and extending around said axial end portion, and said gas collecting chamber communicating with said inflation opening.

5. The gas bag module of claim 1, wherein said gas generator has a cylindrical container wall with a plurality of gas outlet openings formed in said container wall, and said mounting wall has a plurality of through openings which, on the first side of the mounting wall, are aligned and communicate with said gas outlet openings and, on the second side of the mounting wall, communicate with said inflation opening.

6. The gas bag module of claim 1, wherein a housing associated with said mounting wall has a peripheral wall portion parallel to and engaged around said second wall portion of the mounting wall, and a peripheral shoulder portion opposite said first, outwardly directed wall portion of the mounting wall, said bead being engaged between said shoulder portion and said first wall portion.

* * * * *